US 11,615,413 B2

(12) United States Patent
Bellamy et al.

(10) Patent No.: US 11,615,413 B2
(45) Date of Patent: Mar. 28, 2023

(54) DISTRIBUTED LEDGER CORE

(71) Applicant: JPMORGAN CHASE BANK, N.A., New York, NY (US)

(72) Inventors: Michael Bellamy, Verwood (GB); Lawrence Charles Drake, Bournemouth (GB); Debidutta Pruthibiraj Samantaray, Singapore (SG); Raunak Rajpuria, Singapore (SG); Naveen Mallela, Singapore (SG); Samer Falah, Staten Island, NY (US); Sai Murali Krishna Valiveti, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/461,571

(22) Filed: Aug. 30, 2021

(65) Prior Publication Data

US 2022/0067718 A1    Mar. 3, 2022

Related U.S. Application Data

(60) Provisional application No. 63/071,721, filed on Aug. 28, 2020.

(51) Int. Cl.
*G06Q 40/02* (2012.01)
*G06Q 20/38* (2012.01)
(Continued)

(52) U.S. Cl.
CPC .......... *G06Q 20/389* (2013.01); *G06F 9/547* (2013.01); *G06F 16/27* (2019.01); *G06Q 20/02* (2013.01);
(Continued)

(58) Field of Classification Search
CPC .. G06Q 20/389; G06Q 20/02; G06Q 20/4037; G06Q 40/02; G06F 16/27; G06F 9/547
(Continued)

(56) References Cited

U.S. PATENT DOCUMENTS 11,037,142 B2 * 6/2021 Hallam .................. G06Q 20/42
11,341,488 B2 * 5/2022 Chapman ........... G06Q 20/3827
(Continued)

FOREIGN PATENT DOCUMENTS

EP           3798965          3/2021
EP           3798965 A1 *    3/2021   ........... G06Q 20/102
(Continued)

OTHER PUBLICATIONS

Title: Understanding Modern Banking Ledgers through Blockchain Authors: Gareth W. Peters, et al. Publication: Cornell University, computer ans society Date: Nov. 18, 2015 (Year: 2015).*
(Continued)

*Primary Examiner* — Christopher Bridges
*Assistant Examiner* — Yongsik Park
(74) *Attorney, Agent, or Firm* — Greenberg Traurig LLP

(57) ABSTRACT

Distributed ledger cores are disclosed. A method for interacting with a distributed ledger core may include: (1) a distributed banking ledger in a blockchain-based distributed ledger system receiving a transaction request for a transaction from a client system; (2) a smart contract creating a pending transaction; (3) the smart contract sending a posting request for the pending transaction to a ledger interoperability service; (4) the posting generation service generating accounting movements for the transaction; (5) the posting execution service posting the accounting movements and providing posting details to the ledger interoperability service; (6) validating the posting details with a data services module; (7) the smart contract receiving a posting validation
(Continued)

complete notification from the posting execution service via the ledger interoperability service; (8) the smart contract settling the transaction on the distributed banking ledger by writing the transaction as a new block to the distributed banking ledger.

16 Claims, 3 Drawing Sheets

(51) Int. Cl.
    *G06F 16/27*     (2019.01)
    *G06F 9/54*     (2006.01)
    *G06Q 20/02*     (2012.01)
    *G06Q 20/40*     (2012.01)

(52) U.S. Cl.
    CPC ......... *G06Q 20/4037* (2013.01); *G06Q 40/02* (2013.01)

(58) Field of Classification Search
    USPC .......................................................... 705/44
    See application file for complete search history.

(56) References Cited

U.S. PATENT DOCUMENTS

| | | | | |
|---|---|---|---|---|
| 2018/0183768 A1* | 6/2018 | Lobban | .................. | H04L 63/123 |
| 2018/0225194 A1* | 8/2018 | Saleh-Esa | ........ | G06Q 10/06311 |
| 2018/0276626 A1* | 9/2018 | Laiben | .................. | H04L 9/3239 |
| 2018/0374062 A1* | 12/2018 | Hunter | ................. | G06Q 20/027 |
| 2020/0167769 A1* | 5/2020 | Green | ................ | G06Q 20/3825 |
| 2021/0117960 A1* | 4/2021 | Efremov | ............ | G06Q 20/3223 |

FOREIGN PATENT DOCUMENTS

| | | | | |
|---|---|---|---|---|
| WO | 2018081698 | | 5/2018 | |
| WO | WO-2018081698 A1 * | | 5/2018 | ............. G06F 16/27 |
| WO | 2020071965 | | 4/2020 | |
| WO | WO-2020071965 A1 * | | 4/2020 | .......... G06Q 20/102 |
| WO | WO-2021230809 A1 * | | 11/2021 | |

OTHER PUBLICATIONS

International Search Report, dated Jan. 7, 2022, from corresponding International Application No. PCT/US2021/048280.

Written Opinion of the International Searching Authority, dated Jan. 7, 2022, from corresponding International Application No. PCT/US2021/048280.

\* cited by examiner

DISTRIBUTED LEDGER CORE

RELATED APPLICATION

This application claims priority to, and the benefit of, U.S. Provisional Patent Application Ser. No. 63/071,721, filed Aug. 28, 2020, the disclosure of which is hereby incorporated, by reference, in its entirety.

BACKGROUND OF THE INVENTION

1. Field of the Invention

Embodiments are generally directed to a distributed ledger core.

2. Description of the Related Art

Traditionally, banks process payments by including rich data around account master attributes, static account rules, and mapping, that are used by posting services to post transactions to bank general ledgers. Many institutions have decades of technology controls built into their payment applications to comply with regulatory obligations as well as provide an excellent user experience. As value is being transferred and posted on to distributed ledger technology, banks require a way to adapt to these new forms of ledgers that are significantly different in architecture, that require different types of processing, orchestration, and format enrichment.

With distributed ledgers, banks need the ability to post liabilities in the form of on-chain balances to the shared ledger through a process of depositing, transferring, and withdrawing liabilities. Banks have a variety of checks that are performed prior to posting liabilities and there is reporting required after posting the liabilities. These functions of processing payments as well as checking, validating, and reporting are difficult to integrate with distributed ledger architecture for a number of reasons, including the new types of message and data formats required. In addition, the lack of time cut-offs spurred by the potential 24 hours a day, 7 days a week uptime and operational availability of blockchain create additional complexities when interacting with traditional banking applications.

SUMMARY OF THE INVENTION

Distributed ledger cores are disclosed. In one embodiment, a method for interacting with a distributed ledger core may include: (1) receiving, at a distributed banking ledger in a blockchain-based distributed ledger system, a transaction request for a transaction from a client system for a client via an Application Programming Interface (API), wherein a consensus algorithm operating on a plurality of distributed computer nodes in the blockchain-based distributed ledger system updates the distributed banking ledger in which multiple copies of the distributed banking ledger exist across the plurality of distributed computer nodes; (2) creating, by a smart contract executed on the distributed banking ledger, a pending transaction for the transaction on the distributed banking ledger; (3) notifying, by the smart contract, the client system of the pending transaction; (4) sending, by the smart contract, a posting request for the pending transaction to a ledger interoperability service, wherein the ledger interoperability service facilitates interactions between the distributed banking ledger and a banking ledger; (5) generating, by a posting generation service, accounting movements for the transaction; (6) posting, by a posting execution service, the accounting movements and providing posting details to the ledger interoperability service; (7) validating, by the ledger interoperability service, the posting generation service, and/or the posting execution service, the posting details with a data services module; (8) receiving, by the smart contract, a posting validation complete notification from the posting execution service via the ledger interoperability service; (9) settling, by the smart contract, the transaction on the distributed banking ledger by writing the transaction as a new block to the distributed banking ledger; (10) sending, by the smart contract, a posting complete acknowledgement to the posting execution service via the ledger interoperability service; (11) generating, by the posting execution service, a transaction request complete posting; (12) executing, by the posting generation service, the transaction request complete posting and returning a transaction complete posting to the distributed banking ledger via the ledger interoperability service; and (13) sending, by the smart contract, a completion notification to the client system.

In one embodiment, the transaction may include a deposit, a transfer, or a withdrawal.

In one embodiment, the posting request identifies a plurality of accounts involved in the transaction, a posting/value date, a currency for the transaction, and/or an amount of the transaction.

In one embodiment, the pending transaction indicates restricts the transaction until the transaction request complete posting is received.

In one embodiment, the ledger interoperability service, the posting generation service, and/or the posting execution service validates an existence of an account involved in the transaction and/or a balance of the account.

In one embodiment, the ledger interoperability service, the posting generation service, and/or the posting execution service validates the posting details with a reference data service and/or a structure management service.

In one embodiment, the step of settling the transaction on the distributed banking ledger may include crediting or increasing a balance of an on-chain account for the client using an off-chain account as a source for a deposit transaction, or debiting or decreasing the balance of the on-chain account for the client using the off-chain account as a target for a withdrawal transaction.

In one embodiment, the step of settling the transaction on the distributed banking ledger may include moving funds from a first on-chain account to a second on-chain account by crediting or increasing a balance of the first on-chain account and debiting or decreasing the balance of the second on-chain account for a transfer transaction.

According to another embodiment, a distributed ledger core system may include: a blockchain-based distributed ledger system comprising a distributed banking ledger and a plurality of distributed computer nodes, wherein a consensus algorithm operating on the plurality of distributed computer nodes in the blockchain-based distributed ledger system updates the distributed banking ledger in which multiple copies of the distributed banking ledger exist across the plurality of distributed computer nodes; a client system for a client; a banking ledger; a ledger interoperability service that facilitates interactions between the distributed banking ledger and the banking ledger; a posting generation service; a posting execution service; and a data services module. The distributed banking ledger may be configured to receives transaction request for a transaction from a client via an Application Programming Interface (API) from the client system; a smart contract executed on the distributed banking ledger may be configured to create a pending transaction for the transaction on the distributed banking ledger; the smart contract may be configured to notify the client system of the pending transaction; the smart contract may be configured to send a posting request for the pending transaction to the ledger interoperability service; the posting generation service may be configured to generate accounting movements for the transaction; the posting execution service may be configured to post the accounting movements and providing posting details to the ledger interoperability service; the ledger interoperability service, the posting generation service, and/or the posting execution service may be configured to validate the posting details with a data services module; the smart contract may be configured to receive a posting validation complete notification from the posting execution service via the ledger interoperability service; the smart contract may be configured to settle the transaction on the distributed banking ledger by writing the transaction as a new block to the distributed banking ledger; the smart contract may be configured to send a posting complete acknowledgement to the posting execution service via the ledger interoperability service; the posting execution service may be configured to generate a transaction request complete posting; the posting generation service may be configured to execute the transaction request complete posting and returning a transaction complete posting to the distributed banking ledger via the ledger interoperability service; and the smart contract may be configured to send a completion notification to the client.

In one embodiment, the transaction may include a deposit, a transfer, or a withdrawal.

In one embodiment, the posting request identifies a plurality of accounts involved in the transaction, a posting/value date, a currency for the transaction, and/or an amount of the transaction.

In one embodiment, the pending transaction indicates restricts the transaction until the transaction request complete posting is received.

In one embodiment, the ledger interoperability service, the posting generation service, and/or the posting execution service validates an existence of an account involved in the transaction and/or a balance of the account.

In one embodiment, the ledger interoperability service, the posting generation service, and/or the posting execution service validates the posting details with a reference data service and/or a structure management service.

In one embodiment, the smart contract may be further configured to settle the transaction on the distributed banking ledger by crediting or increasing a balance of an on-chain account for the client using an off-chain account as a source for a deposit transaction, or debiting or decreasing the balance of the on-chain account for the client using the off-chain account as a target for a withdrawal transaction.

In one embodiment, the smart contract may be further configured to settle the transaction on the distributed banking ledger by moving funds from a first on-chain account to a second on-chain account by crediting or increasing a balance of the first on-chain account and debiting or decreasing the balance of the second on-chain account for a transfer transaction.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
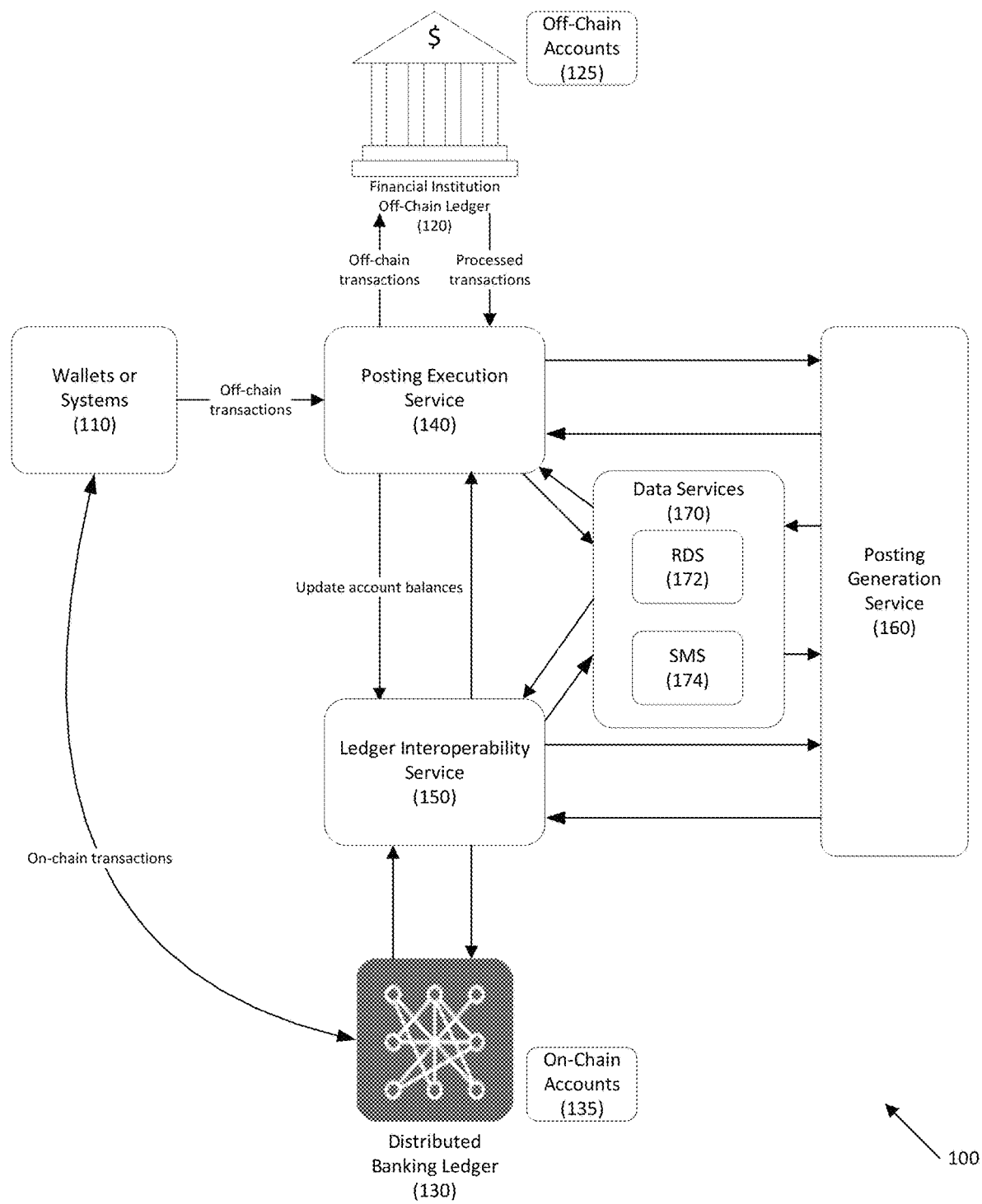
FIG. 1 depicts a distributed ledger core according to an embodiment.

Embodiments are directed to a distributed ledger core that has the ability to serve as a valid deposit keeping system and as the definitive book and record that reflects outstanding liabilities. In effect, embodiments provide the functionality of a core banking system on distributed ledger.

In embodiment, the distributed ledger core is a foundational component built on distributed ledger/blockchain technology that is configured to consume and processes balance posting events. The account and balance information may be encompassed in smart contracts, and the distributed ledger may support two or more forms of transaction processing.

In embodiments, a consensus algorithm operating on a plurality of distributed computer nodes may update the distributed ledger in which multiple copies of the distributed ledger exist across the plurality of distributed computer nodes. Information may be added to a block in the blockchain-based system according to the consensus algorithm.

The first form of transaction processing involves allowing all transaction processing to happen via the distributed ledger core by using on-chain services in the form of smart contracts. Examples of such services may include screening against a permissible list of valid account addresses, checking if there are sufficient funds in the account, putting a transactional hold on funds prior to processing or a manual hold on balances to freeze funds, etc. Any suitable on-chain service may be provided as is necessary and/or desired.

The second form of transaction processing involves allowing for transaction processing to happen using off-chain services in the form of generalized micro-services. Examples of such off-chain services may include posting generation services, core banking applications, etc. Any suitable off-chain service may be provided as is necessary and/or desired.

For example, a posting generation service may perform checks and may execute one or more posting events to the distributed ledger core. The posting events may be specific to each leg of the transaction, and may include details such as: posting type (e.g., deposit or credit); account; value; booking date; value date; exposure date; and settlement date. The ledger core may process these posting events individually, and may update the respective on-chain balances on the distributed ledger.

Additionally, the distributed ledger core may include functionality to account for balance types and dates. Because the distributed ledger may be available 24 hours a day, 7 days a week, and may be distributed across several time zones, it may not have a concept of system dates or business dates that are an integral part of traditional ledger systems. Thus, embodiments may provide a system business date that may maintain a view of the current/previous/next system business date that accounts for holidays and weekends. This provides compatibility with core banking applications and enables 24×7 processing of transactions by the distributed ledger core. The distributed ledger core may also include logic to manage end-of-day processing and date roll-over to update the business dates at the close of business every day.

Referring to FIG. 1, a system for implementing a distributed ledger core is provided according to one embodiment. System 100 may include wallets or systems 110, which may be executed on any suitable electronic device (not shown). Wallets or systems 110 may interact, via an application programing interface (API) with financial institution off-chain ledger 120, which may be any suitable ledger provided by a financial institution. Financial institution off-chain ledger 120 may host a plurality of off-chain accounts 125, such as demand deposit accounts.

Wallets or systems 110 may also interact, via API, with distributed banking ledger 130, which may host on-chain accounts for a plurality of financial institutions. Distributed banking ledger 130 may be a blockchain-based distributed ledger system. A consensus algorithm may operate on a plurality of distributed computer nodes, such as a node for each participating financial institution. Multiple copies of distributed banking ledger 130 may exist across the plurality of distributed computer nodes. A consensus algorithm may operate on each of the distributed computer nodes, and may update distributed banking ledger 130 by adding blocks to the blockchain-based system.

In embodiments, a plurality of financial institutions may maintain accounts on distributed banking ledger 130 and may access distributed banking ledger 130 at a distributed computer node. Each distributed computer may store a public state and a private state for each financial institution.

Examples of distributed ledgers including such states are disclosed in U.S. Patent Application Ser. No. 62/316,841 and of U.S. Pat. No. 10,749,848, the disclosures of which are hereby incorporated, by reference, in their entireties.

In one embodiment, smart contracts may be deployed to distributed banking ledger 130. The smart contracts may perform various functions, including database functions.

In one embodiment, additional distributed ledgers (not shown), such as side chains, may be provided as is necessary and/or desired. For example, the side chains may provide information about foreign exchange rate agreements, contracts, etc.

Wallets or systems 110 may interact with posting execution service 140 for off-chain transactions, such as those involving off-chain accounts 125, and may interact with distributed banking ledger 130 for on-chain transactions, such as those involving on-chain accounts 135. In one embodiment, wallets or systems 110 may interact with posting execution service 140 for balance account update interactions.

Distributed banking ledger 130 and financial institution off-chain ledger 120 may interact via ledger interoperability service 150. Examples of ledger interoperability service 150 are disclosed in U.S. Provisional Patent Application Ser. No. 63/071,727 filed Aug. 28, 2020, and U.S. patent application Ser. No. 17/460,784 filed Aug. 30, 2021 to Bellamy et al., entitled "Distributed Ledger Interoperability Services," filed concurrently herewith. The disclosures of these documents are hereby incorporated, by reference, in their entireties.

Financial institution off-chain ledger 120 may communicate processed transactions to posting execution service 140, which may generate postings for distributed banking ledger 130. The postings may update the balances in on-chain accounts 135.

In embodiments, if transaction from wallet or system 110 involves off-chain processing, it may be communicated, via API, to distributed banking ledger 130, which may communicate the transaction to LIS 150. LIS 150 may provide the transaction to posting generation service 160, which may generate the postings for the transaction, and provide the postings to posting execution service 140. Posting execution service 140 may cause distributed banking ledger 130 to update account balances.

Data services 170 may interface with LIS 150 and may provide reference data service (RDS) 172 and structure management service (SMS) 172. RDS 172 may provide reference data required across micro services, such as managed rates, FX rates, calendar, currency, etc. It may further provide reference data from other source systems.

SMS 174 may enrich the on-chain message structure with customer account master attributes, static account rules, mapping, account status, and posting formats as necessary and/or desired.

Figure 2:
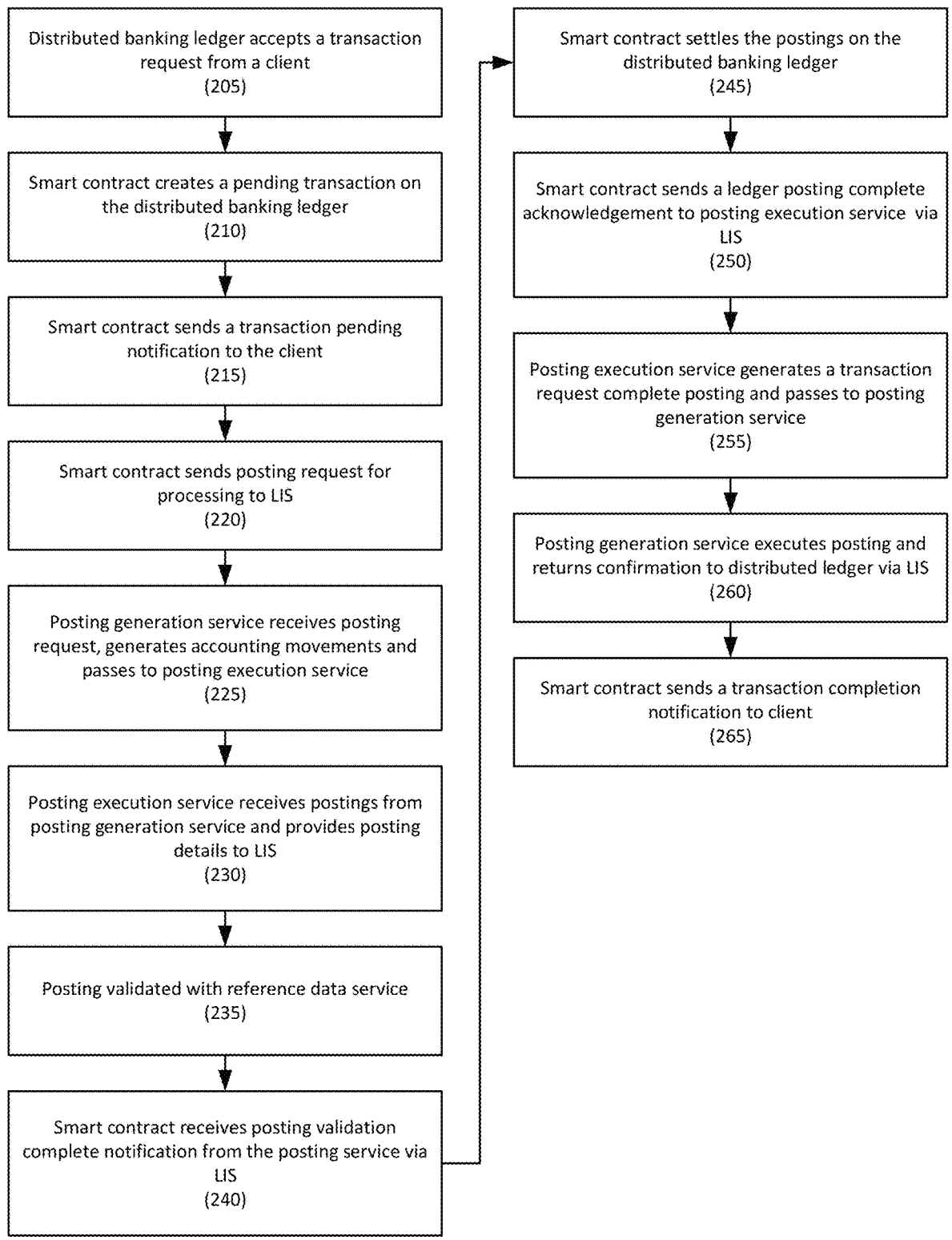
FIG. 2 depicts a method for interacting with a distributed ledger core according to an embodiment.

FIG. 2 depicts a method for interacting with a distributed ledger core according to an embodiment.

In step 205, a distributed banking ledger may receive a transaction request, such as a deposit, transfer, or withdrawal request, from a client (e.g., a wallet or system), a LIS, etc. via API. In one embodiment, the transaction may involve an on-chain account on the distributed banking ledger. In one embodiment, the distributed banking ledger may be a blockchain-based distributed ledger.

In step 210, a smart contract, a computer program, etc. on the distributed banking ledger may create a pending transaction for the transaction on the distributed banking ledger. In one embodiment, the smart contract may place a pending movement on the transaction until confirmation of the transaction being complete is received.

In step 215, the smart contract may provide the notification of the pending transaction to the client.

In step 220, the smart contract may send a posting request to the ledger interoperability service. For example, the posting request may identify the accounts involved, the posting/value dates, the currencies, and the amount.

In step 225, a posting generation service may receive the posting request from LIS, generates accounting movements, and may provide the accounting movements to a posting execution service.

In step 230, the posting execution service may receive the accounting movements from the posting generation service, may post the accounting movements, and may provide the posting details to the ledger interoperability service.

In step 235, the ledger interoperability service, the posting generation service, and/or the posting execution service may validate the postings with a data services module, for example a reference data service and/or a structure management service. This may involve, for example, validating the postings against one or more rules, such as account existence, account status, currency validation etc. This may be performed via real-time webservice calls to the RDS and/or SMS. The data services module may then return a validation complete notification to the LIS.

In step 240, the smart contract may receive a posting validation complete notification from the posting execution service via the ledger interoperability service.

In step 245, the smart contract may settle the posting on the distributed banking ledger. For example, for a deposit transaction, the balance of the clients account held on the distributed ledger may be credited/increased using an off-chain account as the source of funds. For a withdrawal transaction, the balance of the clients account held on the distributed ledger is debited/decreased, and the target for these funds is an off-chain account. For a transfer, funds are moved from one client's on-chain account to another client's on-chain account—one on-chain account is debited/decreased, and another is be credited/increased. In one embodiment, this may include re-calculating ladder balances. This will be discussed in greater detail below.

In step 250, the smart contract may send a ledger posting complete acknowledgement to the posting execution service via the LIS.

In step 255, the posting execution service may generate a transaction request complete posting and may pass to the posting generation service to execute.

In step 260, the posting generation service may return confirmation of the transaction complete to the distributed ledger via the ledger interoperability service.

In step 265, the smart contract may send a completion notification to the client via, for example, API, a separate communication channel, etc.

As noted above, embodiments may calculate a balance ladder using, for example, logic in smart contracts that denotes different types of balances. Like traditional ledger systems, each on-chain account has an associated balance type that is used for various purposes. Each balance type may be represented as a balance ladder, which may be calculated on a per posting basis in near-real-time, that may include historical, current day, and future projections based on the type of balance and how it treats the key date fields on the incoming posting events.

Figure 3:
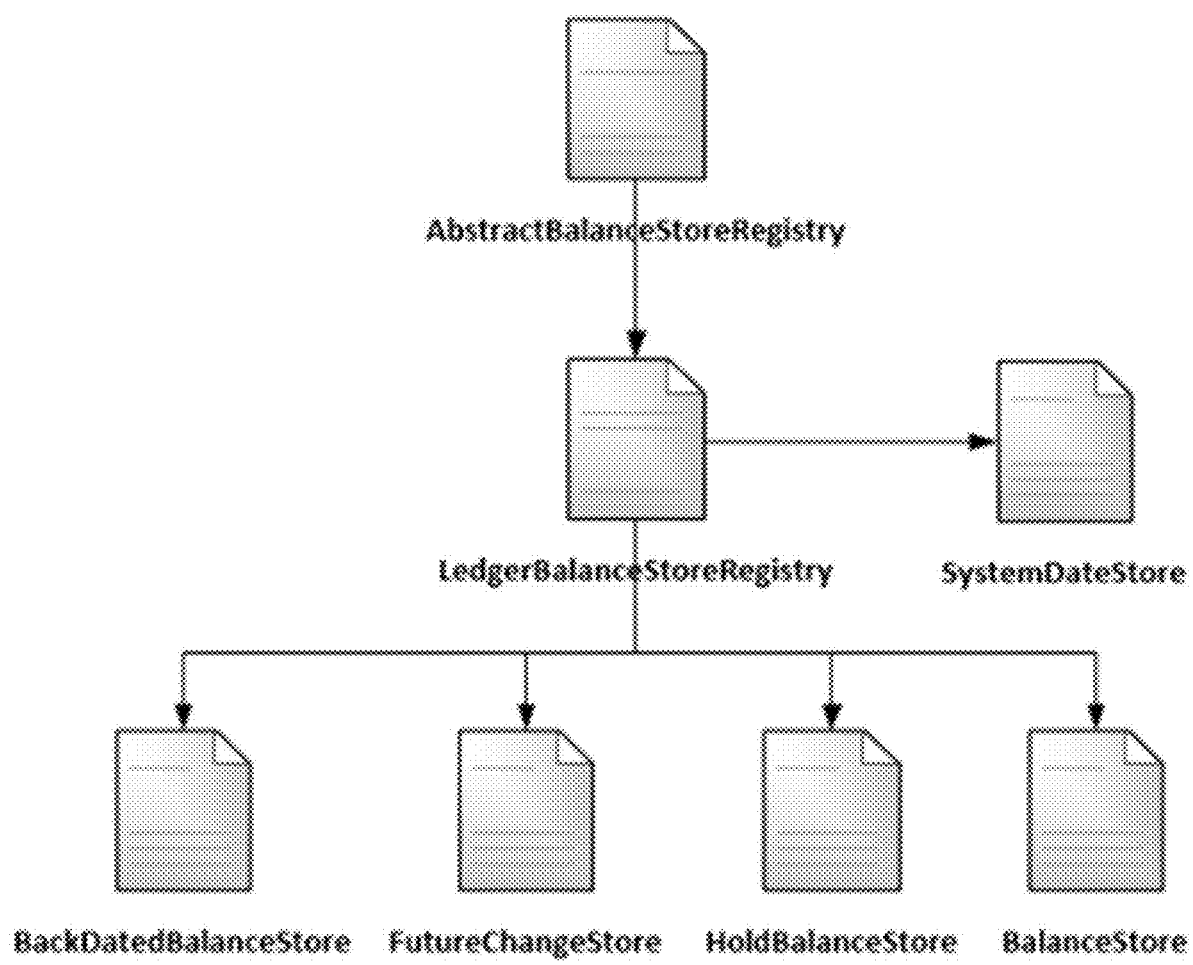
FIG. 3 illustrates a balance ladder according to an embodiment.

FIG. 3 depicts an architectural diagram of a balance ladder, including certain smart contracts that may be used to implement the balance. The architecture may include the following:

AbstractBalanceStoreRegistry: An interface contract that contains the function and event definitions that have been implemented by the LedgerBalanceStoreRegistry contract.

BalanceStore: Stores the mapping of the blockchain IDs (on-chain accounts) and their respective balances for a given day. This may be a date specific contract (i.e., a new contract is created for every calendar day). For each balance type (e.g., ledger, available, cleared, value dated), this contract may store the following four values: opening balance—the balance at the start of the day; current balance—the current intra-day balance (this will be equal to opening balance if no transactions have been received for an account on a day); credit amount—the total amount credited for each balance type on a given day (this may only be added for the first day of the posting in the ladder); and debit amount—the total amount debited for each balance type on a given day. This may only be added for the first day of the posting in the ladder.

HoldBalanceStore: Stores the details of the holds (manual and transactional) that have been added for all accounts.

BackDatedBalanceStore: Used to store the value dated balances by date in the past. Since value dated balances can be updated for past dates as well, this contract may keep track of these balances and updates them when a back-valued posting is received.

SystemDateStore: Used to manage the system dates and associated functionalities such as date roll-over and balance date calculation. As part of the date roll-over, the following steps may be performed:
 a. Change the current system date to the next business date;
 b. Create a new BalanceStore contract for the new date to be added to the ladder window;
 c. Copy any balances from the FutureChangeStore contract that are applicable for the newly created upper limit BalanceStore contract;
 d. Move the lower limit of the ladder window forward by emitting the balances of the lower limit BalanceStore contract in an event and deleting the contract.

LedgerBalanceStoreRegistry: Main logic contract that implements the functions defined in the AbstractBalanceStoreRegistry. This contract creates all the other store contracts described below and maintains the ladder window. The lower and upper limit of the ladder window may be as follows:
 a. Lower Limit: the next calendar day of the previous business date. For example, if current date is Monday, and previous business date is Friday, then the ladder window would start from Saturday;
 b. Upper Limit: the period for which the coin ledger would maintain the balances in the future. The default value of the upper limit of ladder window is 10 calendar days after the current business date;

This contract stores a mapping of the address of the BalanceStore contracts for each day in the ladder window. For any postings received with dates not within the ladder window, the behavior is as follows:
 i. Value Date less than or equal to the previous business date: Update the BackDatedBalanceStore contract.
 ii. Value Date/Exposure Date beyond the upper limit of the ladder window: Create a record in the FutureChangeStore contract.

FutureChangeStore: Stores the balance updates for dates that are beyond the ladder window. These balance updates are applied to the BalanceStore contracts during the date roll-over process.

The following definitions for different balance types may be used herein:

1. Ledger Balance: This balance includes all confirmed cash posting that have been processed by the core ledger and committed to the target account for the current business date. Ledger Balance may have a fixed history and no projections in the balance ladder; only the current day balances are updated based on the booking date received in the posting events.

2. Value Dated Balance: A purpose of a Value Dated Balance is to reflect the balance used to calculate interest accruals. Value Dated Balances have an Adjusted History and Adjusted Projection type of ladder, i.e., based on interest calculations and adjustments, the value dated balance can be updated for a past, a current, or a future date. Value date on cash postings may be the only date that is considered in determining which date to apply the transaction amount movement for this type of balance.

3. Cleared Funds Balance: The cleared funds balance represents the balances that can be used by clients for transactions. The Cleared Funds Balance may be used for funds control and credit risk checks by providing the ability to monitor and/or identify accounts that have high potential to be overdrawn in the future. For credits, the Cleared Funds Balance may be updated based on exposure date in the cash postings. For debits, transactions may be immediately updated on the settlement date including forward value/exposure dated transactions. Thus, credit risk service will not make the funds available to clients until future projected credits are realized.

4. Available Balance: Available Balance represents the available funds that may be used by the client for the current business date, and includes a projection of the availability of funds in the future by maintaining a future available ladder by day. For the Current Available Balance, only transactions that do not have future exposure are included. Credit and debit transactions that have future exposure on the current business day may be projected on the available balance ladder. This balance is always updated on the exposure date received in the cash postings.

5. Hold Balance: The Hold Balance represents the amount of funds that have been ring-fenced and that cannot be used by the clients for any transactions. There may be two types of hold balances: transactional and manual. Transactional holds are short-lived as they are added when an account is to be debited and removed once the debit posting is completed successfully. Manual Holds are added as a result of various operational factors such as court-orders and are removed once the expiry date has been reached.

In embodiments, the distributed banking ledger core may include a plurality of smart contracts that may implement features associated with the system booking date and the balance ladder.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for interacting with a distributed ledger core, comprising:
   receiving, at a distributed banking ledger in a blockchain-based distributed ledger system, a transaction request for a transaction involving an off-chain account on an off-chain core banking ledger from a client system for a client via an Application Programming Interface (API), wherein a consensus algorithm operating on a plurality of distributed computer nodes in the blockchain-based distributed ledger system updates the distributed banking ledger in which multiple copies of the distributed banking ledger exist across the plurality of distributed computer nodes;
   creating, by a smart contract executed on the distributed banking ledger, a pending transaction for the transaction on the distributed banking ledger;
   placing, by the smart contract, a pending notation on the pending transaction;
   notifying, by the smart contract, the client system of the pending transaction;
   sending, by the smart contract, a posting request for the pending transaction to a ledger interoperability service, wherein the ledger interoperability service facilitates interactions between the distributed banking ledger and the off-chain core banking ledger;
   generating, by a posting generation service, accounting movement instructions for the transaction;
   posting, by a posting execution service, the accounting movement instructions to the off-chain account on the off-chain core banking ledger and providing posting details to the ledger interoperability service;
   validating, by the ledger interoperability service, the posting generation service, and/or the posting execution service, the posting details with a data services module;
   receiving, by the smart contract, a posting validation complete notification from the posting execution service via the ledger interoperability service;
   settling, by the smart contract, the transaction on the distributed banking ledger by writing the transaction as a new block to the distributed banking ledger;
   sending, by the smart contract, a posting complete acknowledgement to the posting execution service via the ledger interoperability service;

generating, by the posting execution service, a transaction request complete posting;

executing, by the posting generation service, the transaction request complete posting and returning a transaction complete posting to the distributed banking ledger via the ledger interoperability service; and sending, by the smart contract, a completion notification to the client system.

2. The method of claim 1, wherein the transaction comprises a deposit, a transfer, or a withdrawal.

3. The method of claim 1, wherein the posting request identifies a plurality of accounts involved in the transaction, a posting/value date, a currency for the transaction, and/or an amount of the transaction.

4. The method of claim 1, wherein the pending transaction indicates restricts the transaction until the transaction request complete posting is received.

5. The method of claim 1, wherein the ledger interoperability service, the posting generation service, and/or the posting execution service validates an existence of an account involved in the transaction and/or a balance of the account.

6. The method of claim 1, wherein the ledger interoperability service, the posting generation service, and/or the posting execution service validates the posting details with a reference data service and/or a structure management service.

7. The method of claim 1, wherein the step of settling the transaction on the distributed banking ledger comprises crediting or increasing a balance of an on-chain account for the client using an off-chain account as a source for a deposit transaction, or debiting or decreasing the balance of the on-chain account for the client using the off-chain account as a target for a withdrawal transaction.

8. The method of claim 1, wherein the step of settling the transaction on the distributed banking ledger comprises moving funds from a first on-chain account to a second on-chain account by debiting or decreasing a balance of the first on-chain account and crediting or increasing the balance of the second on-chain account for a transfer transaction.

9. A distributed ledger core system, comprising:
a blockchain-based distributed ledger system comprising:
a distributed banking ledger; and
a plurality of distributed computer nodes, wherein a consensus algorithm operating on the plurality of distributed computer nodes in the blockchain-based distributed ledger system updates the distributed banking ledger in which multiple copies of the distributed banking ledger exist across the plurality of distributed computer nodes;
a client system for a client;
an off-chain core banking ledger comprising an off chain account;
a ledger interoperability service that facilitates interactions between the distributed banking ledger and the off-chain core banking ledger;
a posting generation service;
a posting execution service; and
a data services module;
wherein:
the distributed banking ledger is configured to receive a transaction request for a transaction involving the off-chain account on the off-chain core banking ledger from a client via an Application Programming Interface (API) from the client system;

a smart contract executed on the distributed banking ledger is configured to create a pending transaction for the transaction on the distributed banking ledger;

the smart contract executed on the distributed banking ledger is configured to place a pending notation on the pending transaction;

the smart contract is configured to notify the client system of the pending transaction;

the smart contract is configured to send a posting request for the pending transaction to the ledger interoperability service;

the posting generation service is configured to generate accounting movement instructions for the transaction;

the posting execution service is configured to post the accounting movement instructions and providing posting details to the ledger interoperability service;

the ledger interoperability service, the posting generation service, and/or the posting execution service is configured to validate the posting details with a data services module;

the smart contract is configured to receive a posting validation complete notification from the posting execution service via the ledger interoperability service;

the smart contract is configured to settle the transaction on the distributed banking ledger by writing the transaction as a new block to the distributed banking ledger;

the smart contract is configured to send a posting complete acknowledgement to the posting execution service via the ledger interoperability service;

the posting execution service is configured to generate a transaction request complete posting;

the posting generation service is configured to execute the transaction request complete posting and returning a transaction complete posting to the distributed banking ledger via the ledger interoperability service; and the smart contract is configured to send a completion notification to the client.

10. The distributed ledger core system of claim 9, wherein the transaction comprises a deposit, a transfer, or a withdrawal.

11. The distributed ledger core system of claim 9, wherein the posting request identifies a plurality of accounts involved in the transaction, a posting/value date, a currency for the transaction, and/or an amount of the transaction.

12. The distributed ledger core system of claim 9, wherein the pending transaction indicates restricts the transaction until the transaction request complete posting is received.

13. The distributed ledger core system of claim 9, wherein the ledger interoperability service, the posting generation service, and/or the posting execution service validates an existence of an account involved in the transaction and/or a balance of the account.

14. The distributed ledger core system of claim 9, wherein the ledger interoperability service, the posting generation service, and/or the posting execution service validates the posting details with a reference data service and/or a structure management service.

15. The distributed ledger core system of claim 9, the smart contract is further configured to settle the transaction on the distributed banking ledger by crediting or increasing a balance of an on-chain account for the client using an off-chain account as a source for a deposit transaction, or debiting or decreasing the balance of the on-chain account for the client using the off-chain account as a target for a withdrawal transaction.

16. The distributed ledger core system of claim 9, the smart contract is further configured to settle the transaction on the distributed banking ledger by moving funds from a first on-chain account to a second on-chain account by debiting or decreasing a balance of the first on-chain account and crediting or increasing the balance of the second on-chain account for a transfer transaction.

* * * * *